Patented Oct. 31, 1933

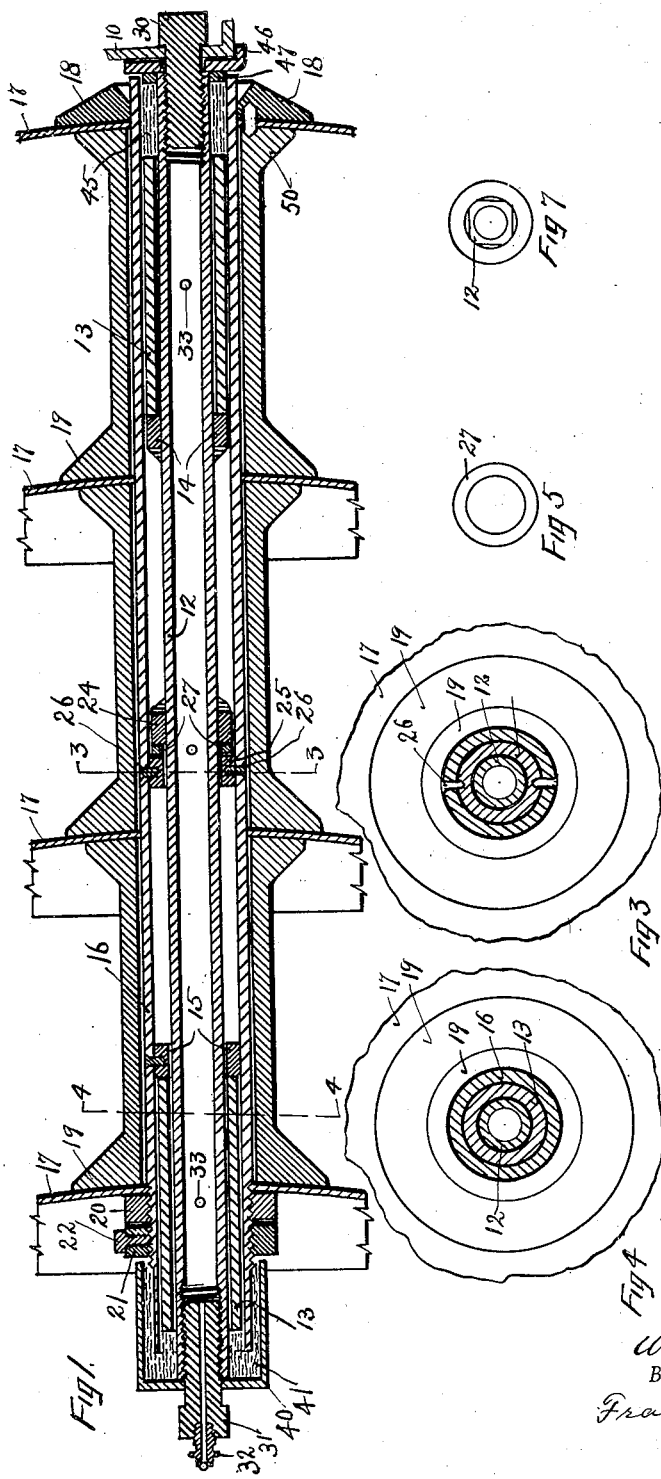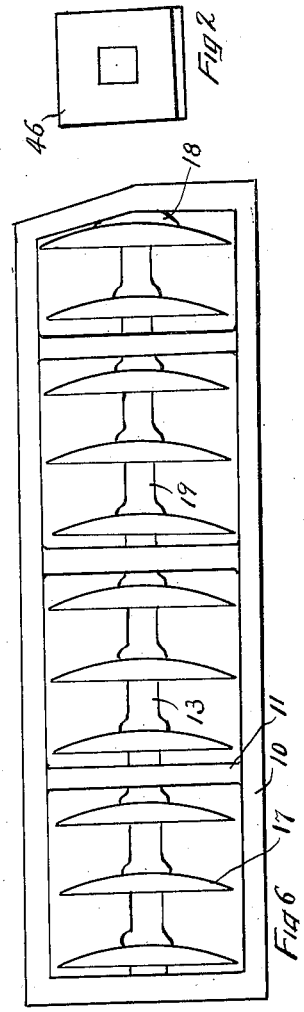

1,932,619

UNITED STATES PATENT OFFICE 1,932,619

BEARING FOR EARTH WORKING TOOLS

William E. Goble, Fresno, Calif., assignor of one-half to Kyle and Company, Fresno, Calif., a corporation

REISSUED

Application January 18, 1932, Serial No. 587,219
Renewed August 22, 1933

3 Claims. (Cl. 308—19)

My invention relates to an earth working tool and more specifically to one in which the earth digger rotates such as a disc cultivator, and in which it is desirable to have a bearing that resists the entrance of sand and dirt thereto.

The object I have accomplished is the formation of a bearing for an earth working tool which can be kept greased or thoroughly oiled and which will resist and exclude the entrance of dirt, dust, or sand into the wearing parts of the bearing.

In the drawing herewith Fig. 1 is a sectional view of a portion of a disc cultivator showing the arrangement of the bearing, the axle, and the tube supporting the discs, with other features which are apparent. Fig. 2 shows a lock washer. Fig. 3 is a cross sectional view of the device shown in Fig. 1 along the line 3—3 in Fig. 1. Fig. 4 is a cross sectional view along section line 4—4 in Fig. 1. Fig. 5 is a thrust washer. Fig. 6 is a plain top view of the disc assembly in a frame. Fig. 7 is an end view of the axle.

Referring to the drawing, I have constructed a frame 10 which has sides and ends which may be in the form of a rhomboid or a parallelogram, and which may have a plurality of cross supports 11. Extending laterally within this frame and rigidly attached thereto is axle 12. The ends of the axle are squared as shown in Fig. 7 and it is attached to the frame so that the said axle cannot turn. I have provided floating bearings 13 which are adapted to turn on the axle near either end thereof. Means for holding floating bearings 13 in the position near the end of the axle consist of stop ring 14 at one end which is attached to the axle a spaced distance from the end, thus forming a stop to prevent the bearing 13 from sliding endwise toward the center of the axle. At the opposite end of the assembled axle and bearing, a stop 15 is likewise positioned, said stop 15 being attached to tube 16 within said tube and a spaced distance from the end. Tube 16 is intended as the support for discs 17. It encircles the axle and bearings 13. The discs are attached to tube 16 as follows:

At one end of tube 16 a stop 18 is attached. Discs 17 are formed with a hole through the center thereof of sufficient size so that tube 16 can pass therethrough. Tube 16 is threaded through one of said discs, then through a spacer 19, then through another disc, then through another spacer and disc until the discs and spacers approximately extend alternately the length of tube 16. Nut 20 which is adapted to screw on the end of tube 16 is then screwed against the last disc, clamping the assembled discs and spacers solidly with tube 16. For the purpose of locking said assembled discs, spacers, and tube 16 together, I have used lock nut 21 to bear against regular nut 20. A set screw 22 can be adapted to lock the lock nut. It will be noted that when thus assembled, the disc, spacer, and tube 16 assembly is adapted to rotate on axle 12 through the medium of bearings 13 which are between the said axle and tube 16.

To take up the end play of the discs I have rigidly attached an annular ring 24 to axle 12 near the lateral center thereof, and have attached an annular ring 25 to the inside of tube 16 preferably by means of a screw 26. The annular ring 24 is of such diameter that it can rotate within tube 16 and the opening in annular ring 25 is such that axle 12 can be rotated therein. Said annular rings 24 and 25 are positioned so that thrust washer 27 encircles axle 12 and is positioned between annular rings 24 and 25. It is noted that the discs are uniformly arranged on tube 16 with the concave surfaces facing the same direction, and likewise the convex surfaces are facing in the opposite direction. In using the disc assembly the pressure of the earth against the concave sides of the discs will cause the disc assembly to bear in a direction along the lineal line or diameter of tube 16 from the concave face toward the convex face thereof. Annular rings 24 and 25, forming the thrust bearing, are arranged with reference to each other so that the approaching bearing faces of the two rings will normally press toward each other when the disc assembly is in use as above noted.

Axle 12 is hollow. At either end thereof are cap screws 30 and 31 which are adapted to hold the axle to frame 10. Cap screw 31 is bored its lateral length and an alemite grease cup 32 is placed therein for the purpose of permitting oil or grease to be injected to the inside of the axle. By means of holes 33 through the wall of the axle to the hollow portion thereof said grease or oil is fed to the bearings. A cap 40 at one end of said assembly is adapted to contain packing 41 and to cover the one end of the assembled tube 16, bearing 13, and axle 12. At the opposite end packing 45 is placed within the end of tube 16 and is held therein by means of plate 47 and washer 46. It will be noted that axle 12, bearings 13, and the thrust bearing composed of annular rings 24 and 25 and thrust washer 27 are all encased within tube 16 so that it is impossible for dust or dirt to enter therein except at the ends of said tube 16 which are inclosed by the packing and caps, and coverings hereinbefore referred to. The discs are locked to the tubular housing 16 by means of a pin 50 extending through the disc and into the spacers or other means between which the discs are clamped.

While the drawing represents a disc cultivator, other earth working tools which function by rotating can be substituted.

I claim as new and ask for Letters Patent:

1. An earth working tool comprising a tubular housing adapted to attach a plurality of earth working tools thereto, a fixed axle adapted for the tubular housing to rotate thereon, packing means at each end of said assembled tubular housing and axle adapted to exclude dust and dirt therefrom, and a thrust bearing near the approximate center of the assembled housing and axle consisting of an annular stop member attached to the axle, and an annular stop member attached to the inside of the housing, said stop members being positioned to cooperate in limiting the lateral movement of the housing relative to the axle, a chamber within the tubular housing and adjacent to the thrust bearing, said chamber being adapted to hold a lubricant.

2. In an earth working tool having a fixed axle, a tubular housing adapted to rotate on the fixed axle, and means at each end of the housing adapted to exclude dirt therefrom, of a thrust bearing intermediate between the ends of the axle, said thrust bearing consisting of a stop attached to the axle, and an annular stop attached to the inside of the housing and approximately concentric therewith, said stops being positioned so that adjacent faces thereof engage, the tubular housing adjacent to the thrust bearing being adapted to hold a lubricant.

3. In an earth working tool having a fixed axle, a housing adapted to have earth working elements attached thereto, means for adapting the housing to be rotated on said axle, a thrust bearing intermediate of the ends of the axle consisting of a stop on the axle and an annular stop on the inside of the housing positioned to engage with the stop on the axle when the axle and housing are assembled, the housing being adapted to hold a lubricant adjacent to the thrust bearing.

WILLIAM E. GOBLE.